(12) United States Patent
Guarraci et al.

(10) Patent No.: US 8,661,249 B2
(45) Date of Patent: Feb. 25, 2014

(54) HEALTH KEYSET MANAGEMENT

(75) Inventors: Brian J. Guarraci, Redmond, WA (US); Christopher C. White, Seattle, WA (US); Johnson T. Apacible, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1251 days.

(21) Appl. No.: 11/860,016

(22) Filed: Sep. 24, 2007

(65) Prior Publication Data
US 2009/0307488 A1 Dec. 10, 2009

(51) Int. Cl.
*H04L 29/06* (2006.01)
(52) U.S. Cl.
USPC .............................. 713/168; 380/259; 380/278
(58) Field of Classification Search
USPC ................... 713/168; 380/255, 259, 277–279
See application file for complete search history.

(56) References Cited

U.S. PATENT DOCUMENTS

| | | | |
|---|---|---|---|
| 7,111,172 B1 * | 9/2006 | Duane et al. | 713/182 |
| 7,702,906 B1 * | 4/2010 | Karr et al. | 713/164 |
| 2002/0126849 A1 | 9/2002 | Howard, Jr. et al. | |
| 2003/0051146 A1 * | 3/2003 | Ebina et al. | 713/185 |
| 2004/0017917 A1 | 1/2004 | Hammersmith et al. | |
| 2004/0068653 A1 * | 4/2004 | Fascenda | 713/168 |
| 2005/0108537 A1 * | 5/2005 | Puri et al. | 713/176 |
| 2005/0177749 A1 | 8/2005 | Ovadia | |
| 2006/0089123 A1 * | 4/2006 | Frank | 455/411 |
| 2007/0015532 A1 | 1/2007 | Deelman | |
| 2007/0277228 A1 * | 11/2007 | Curtis et al. | 726/4 |
| 2008/0104617 A1 * | 5/2008 | Apacible et al. | 719/328 |

FOREIGN PATENT DOCUMENTS

KR 1020040098962 A 11/2004

OTHER PUBLICATIONS

International Search Report, Written Opinion dated mailed Sep. 24, 2008 for PCT Application Serial No. PCT/US2008/077552, 11 pages.

* cited by examiner

*Primary Examiner* — Joseph P. Hirl
*Assistant Examiner* — John B King

(57) ABSTRACT

Systems and methodologies that facilitate delegation of keyset management to a platform presenting a centralized health-related data repository are provided. Effectively, a central keyset manager is provided that generates, manages and distributes key material to client applications and servers deploying the platform. Thus, communications with the platform storing sensitive health-related data can be secured without incurring the costs associated with implementing and enforcing policies associated with key generation and expiration among a plurality of servers and client applications. Additionally, the innovation can scale keyset management to meet short term demand needs.

20 Claims, 9 Drawing Sheets

HEALTH KEYSET MANAGEMENT

BACKGROUND

The evolution of computers and networking technologies from high-cost, low performance data processing systems to low cost, high-performance communication, problem solving, and entertainment systems has provided a cost-effective and time saving means to lessen the burden of performing every day tasks such as correspondence, bill paying, shopping, budgeting information and gathering, etc. For example, a computing system interfaced to the Internet, by way of wire or wireless technology, can provide a user with a channel for nearly instantaneous access to a wealth of information from a repository of web sites and servers located around the world. Such a system, as well, allows a user to not only gather information, but also to provide information to disparate sources. As such, online data storing and management has become increasingly popular.

Financial information systems and the like provide access to sensitive data, which can be convenient for a user; however, strong security with respect to such systems is desired so the information can remain protected. To this end, developers of these systems are increasingly implementing more secure associations between users and their credentials or the platform being accessed. In an open online environment, such as the World Wide Web, packet sniffing and other communication compromising techniques are fairly simple requiring increased security methods and credentials. Many systems have started adding avatars or other verification questions/facts that a user must appropriately select or answer in addition to providing a user name and password. Additionally, tokens can be used in such systems and can comprise a plurality of data fields that are typically encrypted. The tokens, as well as the encryption/decryption algorithms, can be of increasing complexity and must be encrypted and decrypted at least at the system node. Moreover, protocols for accessing the systems are becoming more secure, requiring greater processing power which can slow access. The trends in security are moving toward the more secure association of users and platform by requiring more secure passwords, additional information beyond user name and password, better encryption algorithms for the credentials, and the like. Additionally, applications are continually being developed to utilize such platforms, and platforms are responding by being more open with respect to available methods and mechanisms for accessing such. In this regard, applications can be developed for the platform without preplanning by the platform—thus, rouge applications can become a problem in this configuration.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

A keyset management framework is provided for a platform configuration, such as a service-based platform for example, that facilitates managing key material between client applications and the platform and among server components of the platform. Data communications between client applications and the platform can be encrypted to protect sensitive data from interception. For example, an application can desire access to one or more records stored by the platform but not possess the proper key material with which to encrypt conversations. Further, a server component of the platform may not have current key material or correct key material as other server components in the platform possess. Typically, from a support perspective, system administrators must learn, implement and enforce keyset policies on all server machines. From a platform perspective, there is not a reliable way to enforce that a server is compliant with keyset management policies.

In one embodiment, the platform can receive a request for key material with which to encrypt subsequent communications with the platform. The key material can be RSA material, symmetric key material, etc., for example. The platform can distribute a currently valid keyset to the requestor. If the keyset expires, the platform can refresh the expired keyset with a new valid keyset. If requests exceed the number of available keysets, existing keysets can be cloned to satisfy the demand in the short term. The platform can push keysets to server components within the platform such that all server components share keysets while enabling reliable enforcement of keyset policy by a single entity.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
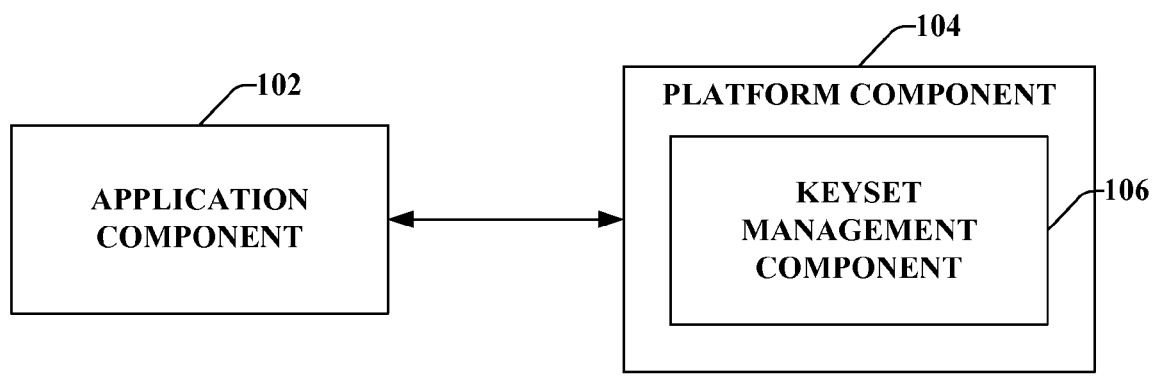
FIG. 1 illustrates a block diagram of an exemplary system that manages keysets for secured authentication and communication with a platform.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Now turning to the figures, FIG. 1 illustrates a system 100 that facilitates managing keysets for secured authentication and communication with a platform. An application component 102 is provided that desires to communicate with a platform component 104. In accordance with one aspect, communications between application component 102 and platform component 104 require a set of cryptographic keys. The set of cryptographic keys can be employed to establish authenticated communication sessions. In addition, the set of keys can be utilized to protect and secure communicated data via encrypted envelopes. A keyset encapsulates each cryptographic key. In one embodiment, there are two types of keysets, authentication session keysets and a secure envelope keysets. It is to be appreciated that additionally keysets and/or types of keysets can be employed as necessary. The platform component 104 comprises a keyset management component 106 that implements and enforces keyset management policies. In accordance with an aspect, the application component 102 can initialize interaction with the platform component 104 to obtain a currently valid keyset from the keyset management component 106. The application component 102 can employ the obtained keyset in subsequent communications with the platform component 104.

In one embodiment, the platform component 104 can comprise one or more data records related to users of the platform component 104, for example. In this regard, the platform component 104 can be service-based, facilitating storing, retrieving, modifying, and otherwise accessing certain data records. A record, for purposes of the subject matter described herein, can be defined as a collection of data that is tied to an entity, such as a user/individual; the entity (user/individual, for example) can have one or more associated records. The platform component 104 can house such records, which can relate to substantially any type of data. Each record, for example, can have one or more data fields or entries. For example, the data can be sensitive data, such as financial and/or health information related to one or more users, less sensitive data, such as productivity files, gaming data, etc., or many other types and/or combinations of data. Moreover, the platform component 104 can expose one or more methods to access the data, such as web methods (e.g. web services).

In one embodiment, the application component 102 can desire to access to the data stored in the platform component 104. For example, the application component 102 can add value to the data, such as by combining the data to create interesting views, graphs, illustrations, predictions, etc. In this regard, the application component 102 can desire access to sensitive data stored in the platform 104; however, the application component 102 can be denied access to the data with respect to the users of the platform component 104 to keep a closed secure system. To this end, the application component 102 can be required to encrypt communications with the platform component 104 to gain prevent interception of sensitive data stored in the platform component 104 and conveyed between application component 102 and platform 104. In addition, encryption mechanisms can be required during authentication sessions between application component 102 and platform component 104. Though many encryption systems can be imagined, in one embodiment, public key cryptography can be employed. In public key cryptography (e.g., RSA, Diffie-Hellman, Cramer-Shoup, etc.), two interrelated keys, a public key and a private key, are generated. The public key is utilized for encryption and can be freely distributed. The private key is employed for decryption and must remain a secret. The two keys are generated such that it is computationally infeasible to infer the private key from the public key. In this regard, the application component 102 can be supplied a public key with which to encrypt communications with the platform component 104. Platform component 104 retains a secret, private key with which to decrypt communications received from the application component 102. Additionally, in accordance with an aspect, the application component 102 can contact the platform component 104 to obtain the public key from the keyset management component 106.

In another embodiment, a symmetrical cryptography mechanism can be implemented. Symmetric key cryptography refers to encryption in which the same key is used for both encryption and decryption. The encryption and decryption keys may be different but related in an easily computable way. Typically, a different key is employed for different messages or groups of messages. Moreover, ideally, each pair of communicating parties should share a different key than the key utilized for other communicating pairs. Pursuant to an example, the application component 102 can be supplied with a key with which to encrypt communications with platform component 104. Further, the platform component 104 utilizes the same key (or a key substantially related in a trivial manner) to decrypt communications from the application component 102. In accordance with an aspect, the application component 102 can contact the platform component 104 to obtain a current key from the keyset management component 106. Application component 102 can employ the obtained key in subsequent communications. Since the keys are shared by both the application component 102 and the platform component 104 to encrypt and decrypt communications, the keys should be changed from time to time. Accordingly, the keys can be configured to expire after a predetermined period. Moreover, application component 102 can contact the key management component 106 to obtain a valid key upon the expiration of an older key. The keyset management component 106 can generate and store keysets. Further, the keyset management component 106 can control the use, selection, allocation and replacement of keys employed between a given pair of communicating parties. For example, the keyset management component 106 can select the keyset or key material to be employed between the application component 102 and the platform component 104. While only one application pair of communicating parties are shown in FIG. 1, it is to be appreciated that the keyset management component 106 can control key material for additional pairs such as additional application components that also desire to communicated with the platform component 104.

Figure 2:
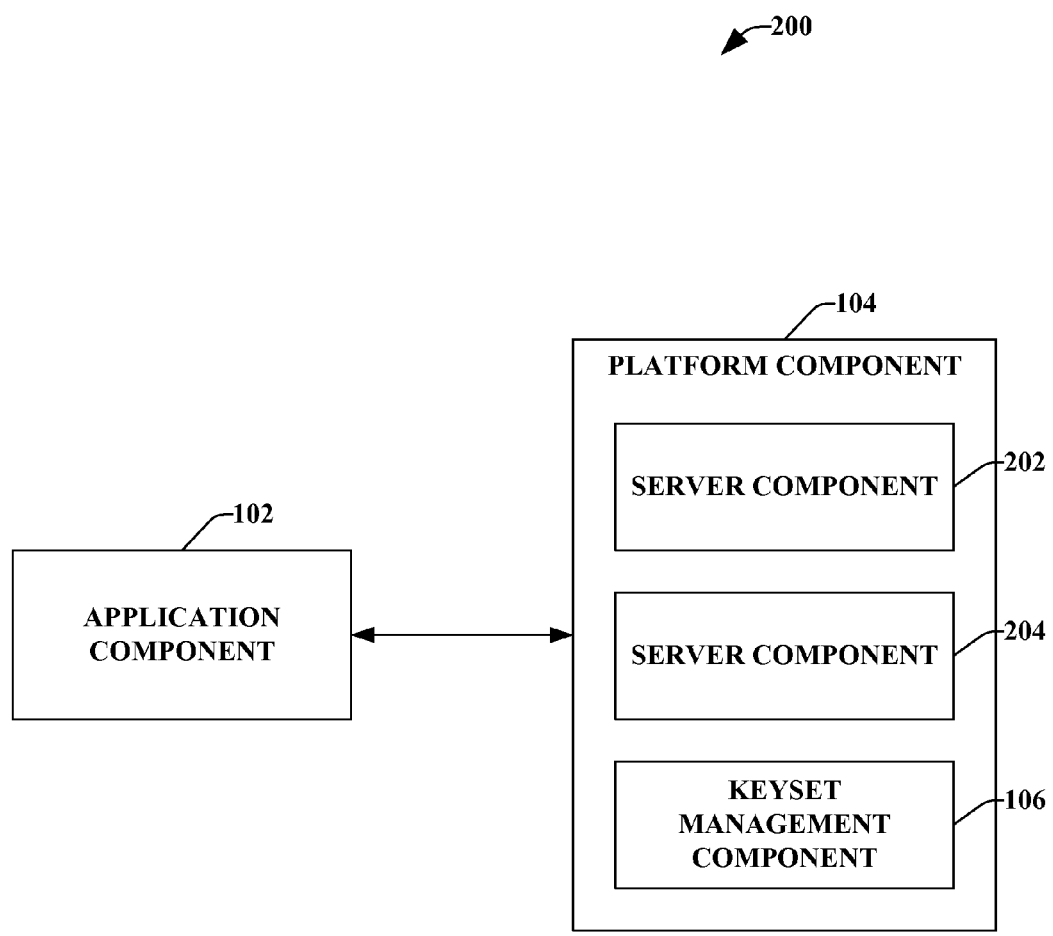
FIG. 2 illustrates a block diagram of an exemplary system that facilitates keyset distribution within a platform.

Referring now to FIG. 2, illustrated is a system 200 that facilitates keyset distribution within a platform. An application component 102 is shown that accesses data and/or methods (such as web methods) of a platform component 104. The platform component 104 can comprise one or more data records related to users of the platform component 104, for example. In this regard, the platform component 104 can be service-based facilitating storing, retrieving, modifying, and otherwise accessing certain data records. The platform component 104 includes a keyset management component 106 that implements and enforces keyset management policies for platform component 104. The application component 102 and the platform component 104 employ keysets to encrypt communications between one another. The keysets can comprise public/private key pairs, symmetric keys, or the like.

According to one aspect of the subject disclosure, the platform component 104 can be implemented, deployed or hosted on a server farm. In this regard, the platform component 104 comprises server components 202 and 204. In one embodiment, server components 202 and 204 can be logically distinct servers. Further, while FIG. 2 depicts only two server components for purpose of explanation, it should be appreciated that any number of servers greater than two may be employed. For example, the platform component 104 can be deployed on a system comprising tens or hundreds of server components. Pursuant to this illustration, the server component 202 can be responsible for providing a different aspect or feature of the platform component 104 then the aspects implemented by the server component 204. For example, the server component 202 can provide authentication functionality for the platform 202. Thus, the server component 202 verifies that the application component 102 may properly access the platform component 104. Further, the server component 204 can provide a web service that facilitates access to data records stored by the platform component 104. According to this example, the application component 102 communicates with both the server component 202 to authenticate and the server component 204 to access data records of the platform component 104. The server components 202 and 204 must have key material to enable secured, encrypted communication with the application component 102. Typically, each server component 202 and 204 would separately manage keyset lifetimes and policies associated with key generation and expiration. Moreover, the server components 202 and 204 must be provided with the keysets required based upon the distributed functionality among the server components. In accordance with the above example, the server component 202 retains authentication keysets while the server component 204 retains secure envelope keysets.

The keyset management component 106, among other things, manages and stores key material that can be employed to secure communications between the platform component 104 and the application component 102. In one embodiment, server components 202 and 204 delegate key management to keyset management component 106. The server components 202 and 204 contact keyset management component 106 to acquire currently valid keysets to secure communications with the application component 102. Keysets can also be employed to secure communications among the server components 202 and 204 as well as other components of the platform component 104. When keysets expire according to a keyset policy enforced by the keyset management component 106, the server components 202 and 204 can re-contact the keyset management component 106 to obtain the refreshed keysets. Further, it is to be appreciated that the keyset management component 106 can automatically distribute keysets as necessary. The keyset management component 106 determines and enforces keyset policies relating to generation and expiration of keys. Accordingly, the keyset management component 106 can push refreshed keysets to the server components 202 and 204 upon expiration and not wait for a request from the server components.

Figure 3:
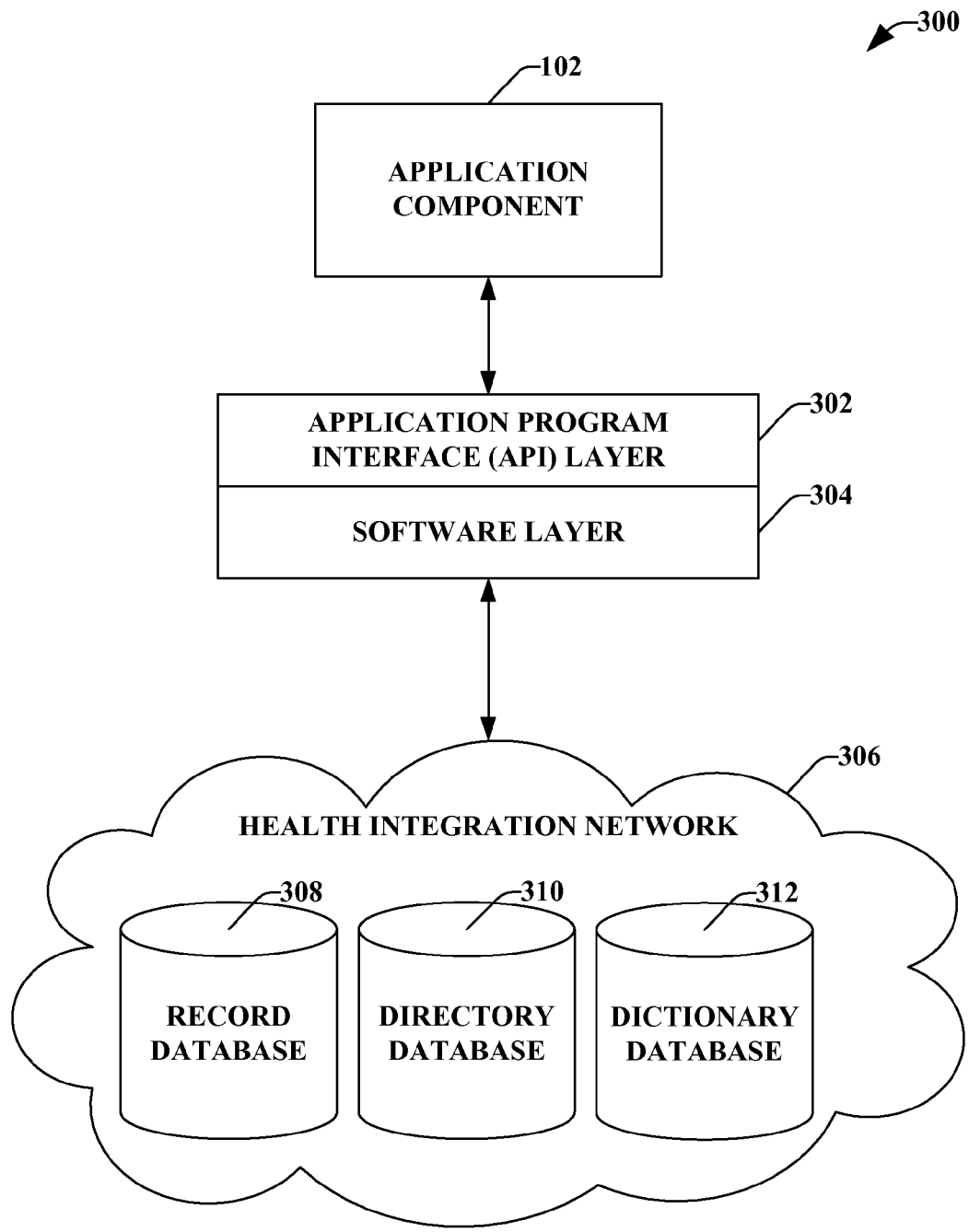
FIG. 3 illustrates a block diagram of an exemplary system that facilitates accessing record data from components of a health integration network.

Turning now to FIG. 3, an example system 300 that facilitates accessing information within a health integration network is shown. As described above, one possible platform implementation is for health-related data, which can be managed in the network provided in this figure. An application component 102 can at least one of display or specify health related data. It is to be appreciated that the application component 102 can be many different types of applications including software applications, electronic devices executing a software application, electronic devices alone, legacy devices interfaceable with a device executing a software application, and the like. The application can operate in a user context and can utilize an application program interface (API) 302 to request and store data within a health integration network 306. It is to be appreciated that the API 302 can synchronously or asynchronously communicate with a plurality of application components 102 of similar or different types. The API 302 can also have a software layer 304 to leverage in interpreting and processing the request. The software layer 304 can be separated out as shown, or it can be integrated within the API 302, the health integration network 306, or both. Upon interpreting and processing a request from the application component 102, the software layer 304 can access the health integration network 306 for any necessary data or to store necessary data to fulfill the request. The software layer 304 can also provide value-add to the data such as assembling data from the health integration network 306, applying business models or processes in conjunction with data, caching data, and/or applying transformations or additional information to/with the data. It is to be appreciated that there may be a plurality of APIs 302 and software layers 304 connecting to a centralized health integration network 306, and the centralized health integration network 306 may be a single system or distributed across multiple systems, platforms, and the like.

The health integration network 306 can comprise a plurality of data stores including a record database 308, a directory database 310, and a dictionary database 312. In addition, the health integration network 306 can comprise many other systems and/or layers to facilitate data management and transfer. Furthermore, the databases can be redundant such that multiple versions of each database are available for other APIs and applications and/or a back-up source for other versions of the databases. Additionally, the databases can be logically partitioned among various physical data stores to allow efficient access for highly accessed systems. Moreover, the databases can be hierarchically based, such as XML and/or relationally based. The record database 308 can be highly distributed and comprise personal health related data records for a plurality of users. The records can be of different formats and can comprise any kind of data (single instance, structured or unstructured), such as plain data, data and associated type information, self-describing data (by way of associated schemas, such as XSL schemas for example), data with associated templates (by way of stylesheets for example), data with units (such as data with conversion instructions, binary data (such as pictures, x-rays, etc.), and the like. Moreover, the record database 308 can keep an audit trail of changes made to the records for tracking and restoration purposes. Additionally, any data type or related instances of the foregoing information can be stored in a disparate database such as the dictionary database 312 described infra. The record database 308 can be partitioned, distributed, and/or segmented based on a number of factors including performance, logical grouping of users (e.g. users of the same company, family, and the like).

The directory database 310 can store information such as user account data, which can include user name, authentication credentials, the existence of records for the user, etc. The directory database 310 can also house information about records themselves including the user to whom they belong, where the record is held (in a distributed record database 308 configuration) authorization rules for the records, etc. For example, a user can specify that a spouse have access to his/her fitness related data, but not medical health related data. In this way, a user can protect his/her data while allowing appropriate parties (such as spouse, doctor, insurance company, personal trainer, etc.) or applications/devices (blood pressure machine, pacemaker, fitness watch, etc.) to have access to relevant data. In addition, the directory database 310 can comprise data regarding configuring application components 102 to interact with the health integration network 306; application components 102 can be required to register with the health integration network 306, and thus, the application data in the directory database 310 can include the registration information.

The dictionary database 312 can hold information relating to vocabulary definitions used by the health integration network 306 and requesting entities such as the API 302 and software layer 304. Such definitions can include data type definitions and information on how to display the different data types or transform them. Additionally, the dictionary database 312 can hold information for display layouts and templates, etc. Furthermore, the dictionary database 312 can hold different look-up tables that define codes through the use of standards and the like. For example, the dictionary database 312 can support International Classification of Diseases, ninth revision (ICD-9) released by the National Center for Health Statistics. These codes identify different diseases and diagnoses; thus a doctor can put one of these codes on a user's chart in the health integration network 306, and the dictionary database 312 can allow the software layer 304 (or API 302) to translate this code into something that makes more sense to the user, such as medical name and/or different, other, or additional information concerning the diagnosis. The dictionary database 312 can also be used to retrieve other metadata such as plural and abbreviated forms of codes (such as ICD-9 codes). It can also hold information that allows conversion between different measurement units, such as between feet to meters, Fahrenheit to Celsius, pounds to kilograms, etc.

In one embodiment, the application component 102, which can be more than one application, can make a call to the API 302 to request, store, or modify data, for example. The API 302 leverages the software layer 304 to process the call made by the application component 102. The software layer 304 can then query its own internal cache or the health integration network 306 for desired data; additionally or alternatively, the software layer 304 can directly query one or a plurality of the databases 308, 310, and 312 for the desired data. The health integration network 306 can provide an authorization scheme similar to that disclosed herein and ensure the application component 102 and/or a user context thereof is authorized to receive the requested data. The software layer 304 can serially or asynchronously query for data until all data is obtained from the health integration network 306. The software layer 304 can then manipulate portions of the data using other data it has obtained to formulate the result desired by the application component 102 and return that result to the application component 102 via the API 302. For example, an application component 102 can request a user's blood pressure reading by calling the API 302, which in turn can communicate with the software layer 304 to formulate the desired reading. The software layer 304 can query, directly or through the health integration network 306, the directory database 310 to obtain the location of the blood pressure reading, the dictionary database 312 to obtain schema, style, and general type information for blood pressure types, and the record database 308 to obtain the actual reading. Querying the record database, for example, can require authorization of the application component 102 and/or a user context provided by the application component 102 before returning the data. Using the schema, the software layer 304 can interpret the record as two integers representing a systolic and diastolic pressure (and perhaps a pulse rate), and return these numbers to the application component 102 through the API 302, or also apply a style, units, or other template to the numbers and return the result whether it be a string, XML, HTML, a picture, or the like. Additionally, the software layer 304 can return the raw data along with the transformation, style, and/or schema information to the application component 102 through the API 302 to allow the application component 102 to apply the these at will. Also, the software layer 304 can store the result in cache memory for future access. It is to be appreciated that the subject matter described is not so limited to the foregoing example/embodiment, but rather this is one of many possible embodiments of an authorization scheme and platform.

Figure 4:
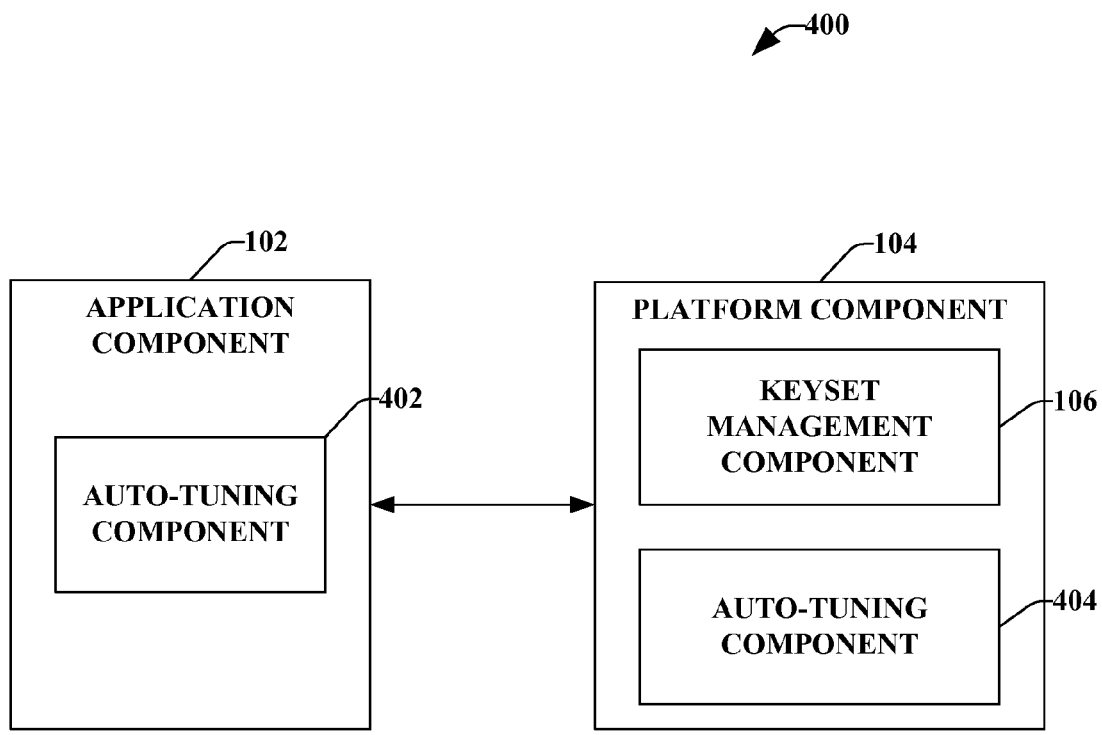
FIG. 4 illustrates a block diagram of an exemplary system that facilitates automatically tuning keysets to meet request needs.

Turning to FIG. 4, illustrated is a system 400 that facilitates automatically tuning keysets to meet request needs. An application component 102 is shown that accesses data and/or methods (such as web methods) of a platform component 104. The platform component 104 can comprise one or more data records related to users of the platform component 104, for example. In this regard, the platform component 104 can be service-based facilitating storing, retrieving, modifying, and otherwise accessing certain data records. The platform component 104 includes a keyset management component 106 that implements and enforces keyset management policies for platform component 104. The application component 102 and the platform component 104 employ keysets to encrypt communications between one another. The keysets can comprise public/private key pairs, symmetric keys, or the like.

Application component 102 secures communications with the platform component 104 by utilizing cryptographic keys encapsulated in keysets. For example, application component 102 employs keysets for encryption and/or decryption of data. In addition, application component 402 can utilize keysets for authentication. Similarly, platform component 104 employs keysets for likewise purposes. Typically, keysets are single purpose such that, for example, a keyset is utilized for encryption and/or decryption of data or a keyset is utilized for authentication. As described above, keyset management component 106 manages and distributes key material to the applications component 102. Keyset management component 106 also manages and distributes key material to server machines implementing the platform component 104. In addition, keyset management component 106 defines and enforces keyset policy associated with key generation and expiration, among other things.

The keyset management component 106 can have a limited number of keysets to distribute. The platform component 104 includes an auto-tuning component 404 that clones keysets at runtime to so that the platform component 104 can scale to meet request needs. For example, platform component 104 may be employing a keyset for encryption/decryption but requires another keyset for authentication purposes. The auto-tuning component 404 can clone a keyset for the platform component 104 to meet the immediate runtime need of an encryption/decryption keyset (e.g., secure envelope keyset) and an authentication keyset.

According to another embodiment, auto-tuning can exist on the client side in addition to the platform side. To this end, application component 102 includes an auto-tuning component 402. Application component 102 employs authentication keysets but also require encryption/decryption keysets to secure communications with the platform component 104. Typically, the platform component 103 provides a set of distinct keysets and is not responsible for duplication for client applications. Application component 102 is responsible for cloning its own keysets when a need arises. Similar to auto-tuning component 404 on the platform component 104, auto-tuning component 402 of the application component 102 can clone a keyset for the application component 102 to scale to meet request needs. For example, the platform component 104 can be implemented on a server as described above with reference to FIG. 2. Application component 102 can retain a keyset for authentication that is employed to authenticate with a first server component of the platform component 104. Application component 102 can require an additional keyset to encrypt and/or decrypt communications with a second server component after authentication is successful. As keysets are typically singular in purpose, auto-tuning component 102 clones the authentication keyset so that application component 102 can employ the cloned keyset to secure communications with the second server component.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent, for instance by inferring actions based on contextual information. By way of example and not limitation, such mechanism can be employed with respect to generation of materialized views and the like.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 5:
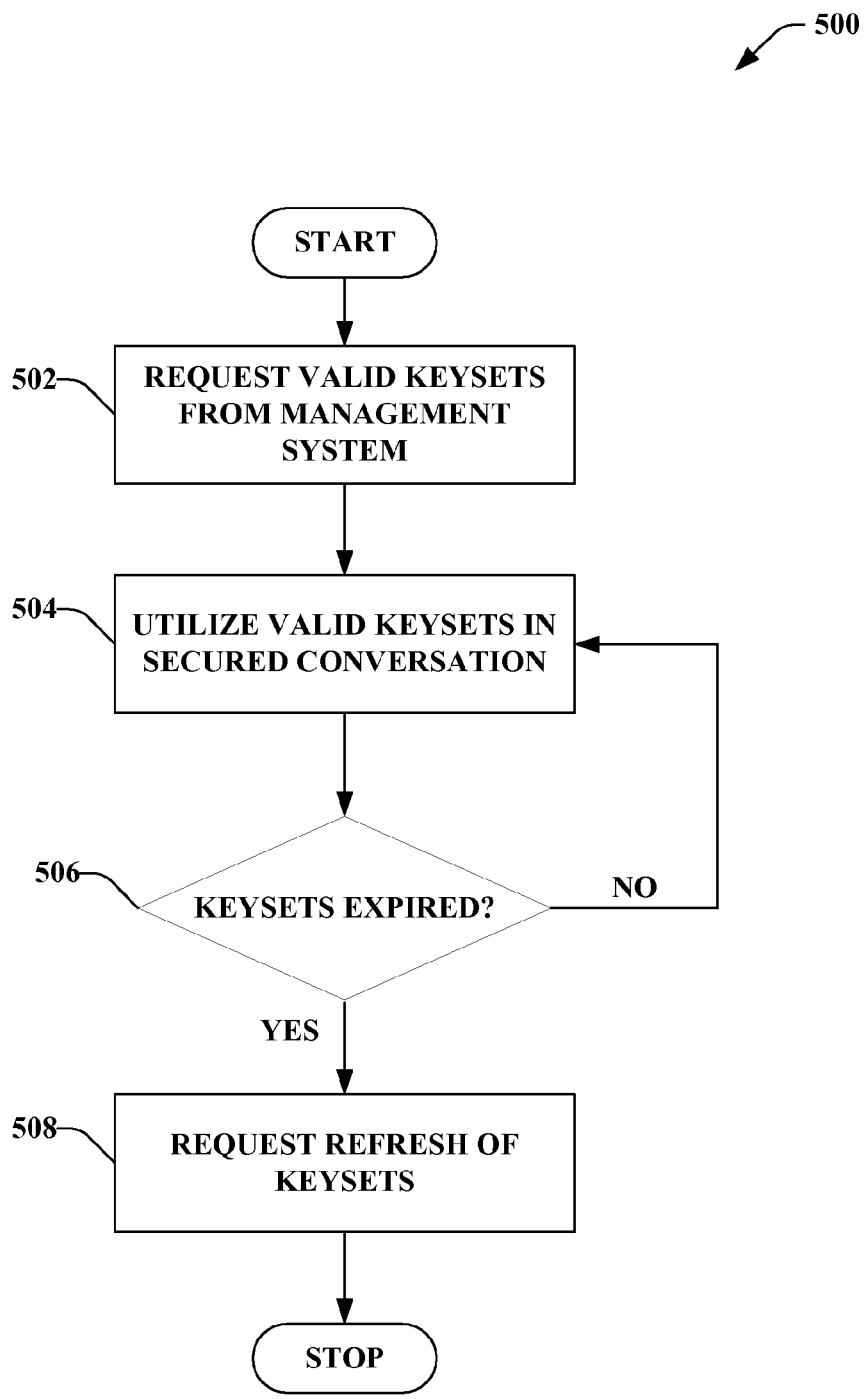
FIG. 5 illustrates an exemplary flow chart of a method for distributing keysets in a platform.

Referring now to FIG. 5, illustrated is a methodology 500 that facilitates distributing keysets in a platform. As mentioned supra, this method 500 can be employed in a platform scenario where the platform stores data records and controls access thereto. For example, a health integration network can employ this method to provide encrypted communications with client applications desiring to access data records stored in the health integration network. A keyset can comprise a public/private key pair, symmetric keys, or other such cryptographic mechanism. At reference numeral 502, a valid keyset is requested from a management system. The request can originate from a server component utilized in the deployment of the platform or from a client application desiring to communicate with the platform. The keyset can be employed to encrypt communications between a client application and the platform. In addition, the keyset can be employed to secure communications among the platform components. The management system controls, distributes, and generates keysets and, further, establishes policy associated with keyset expiration.

At reference numeral 504, the valid keyset is utilized to secure conversations. The conversations can be between client applications and the platform and/or internally between platform components. At reference numeral 506, a determination is made as to whether the keyset has expired. If no, the method 500 returns to reference numeral 504 and the keyset continues to be employed to secure communications. If the keyset has expired, the method proceeds to reference numeral 508. At 508, a new refreshed keyset is requested from the management component so that secured conversations can continue to occur.

Figure 6:
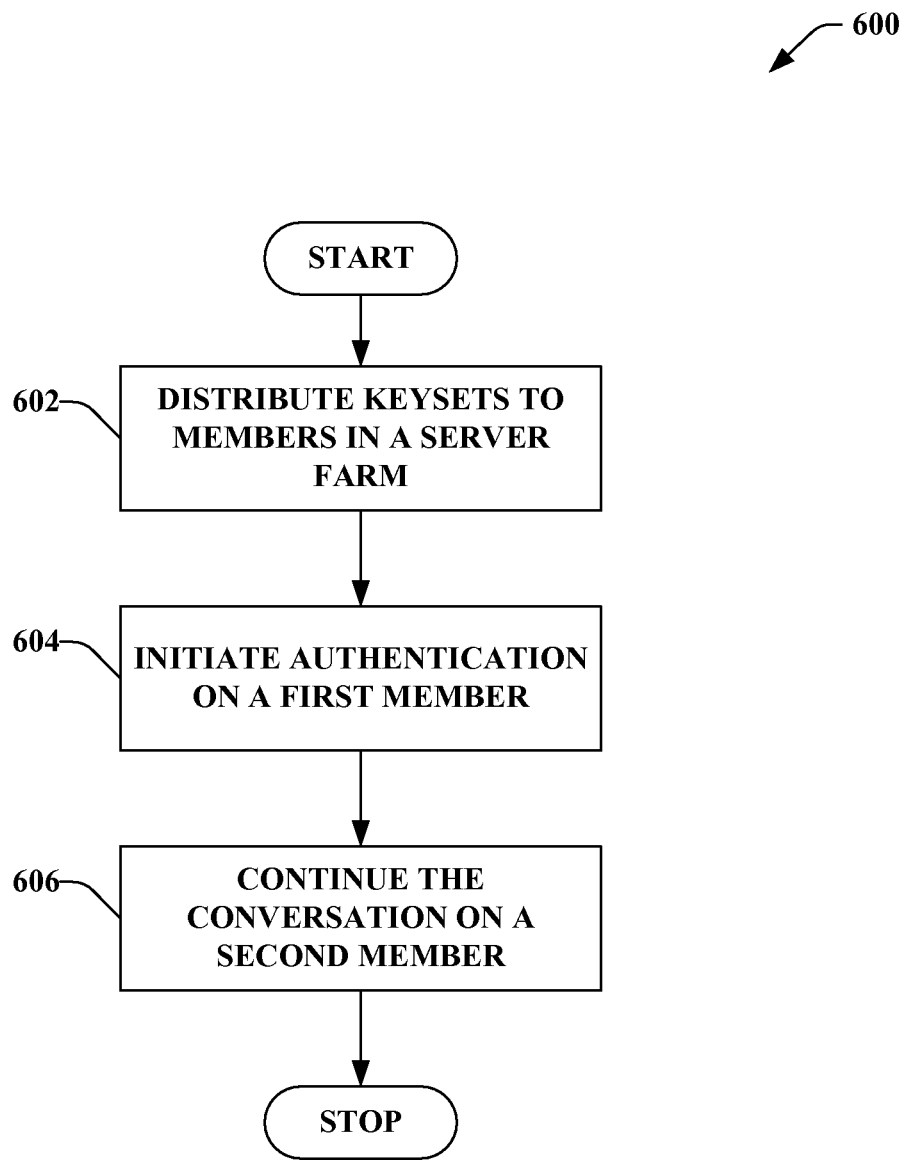
FIG. 6 illustrates an exemplary flow chart of a method for managing keysets in a distributed environment to allow communication.

Turning now to FIG. 6, illustrated is a methodology 600 that facilitates managing keysets to allow secured communications in a distributed environment. Method 600, among other things, can be employed in a platform scenario that is deployed in a server farm. At reference numeral 602, keysets are distributed to members in a server farm. A keyset management component can distribute and refresh keysets among the members of the server farm. The keyset management component can allocate keysets based upon the functionality of the platform implemented by specific members of the server farm. At reference numeral 604, an authentication session is initiated with a first member of the server farm. The authentication session can be between the platform and a client application desiring access to the platform. The authentication session can employ one type of keyset to encrypt the communications during authentication. At reference numeral 606, the conversation is continued with a second member of the server farm. The continuing conversation can utilize another type of keyset to encrypt data communications. The client application can continue conversations without knowledge of the keyset management occurring in the platform.

Figure 7:
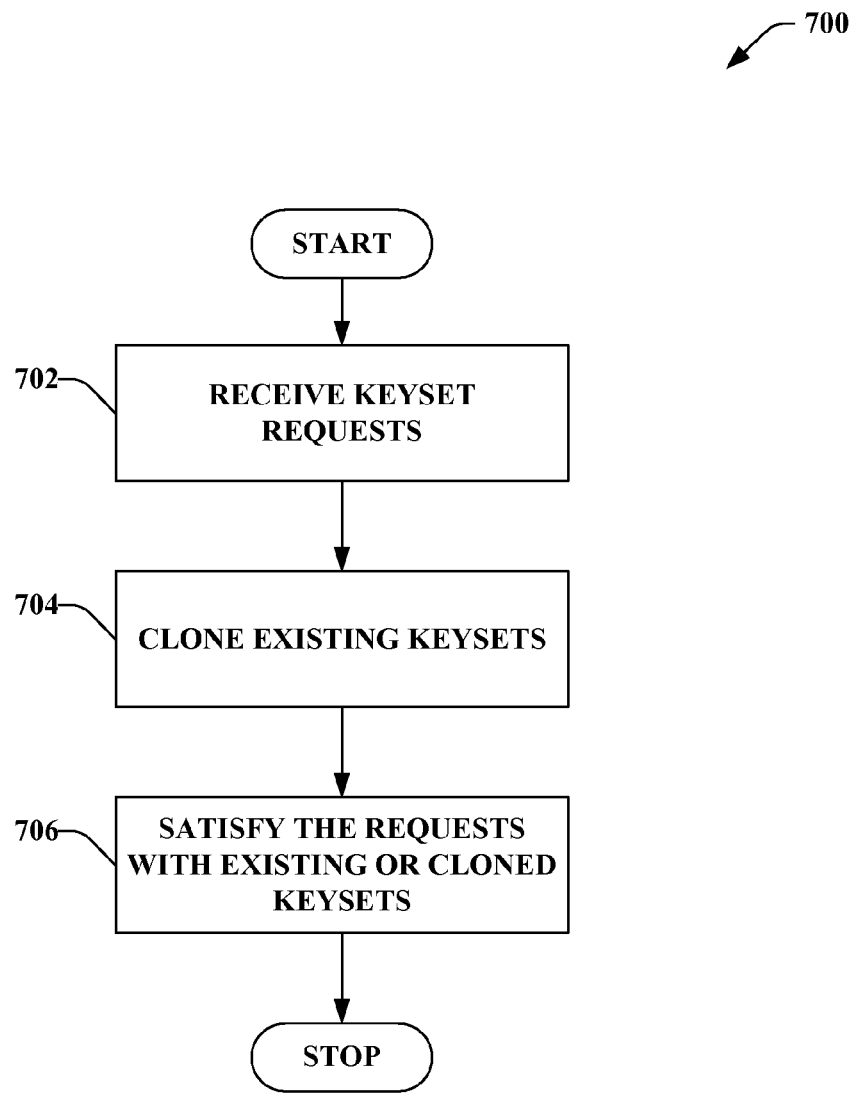
FIG. 7 illustrates an exemplary flow chart of a method for scaling keysets to match request needs.

Referring to FIG. 7, a methodology 700 is depicted that scales keysets to match request needs. At reference numeral 702, keyset requests are received. The requests can be for refreshed keysets to continue communications or for new keyset to initialize communications. The number of requests can exceed the number of existing keysets in the platform. At reference numeral 704, existing keysets are cloned. Cloned keysets enable the platform to scale to meet a level of demand without requiring new keysets to be generated or supplied. At reference numeral 706, cloned keysets are employed to satisfy the received requests.

Figure 8:
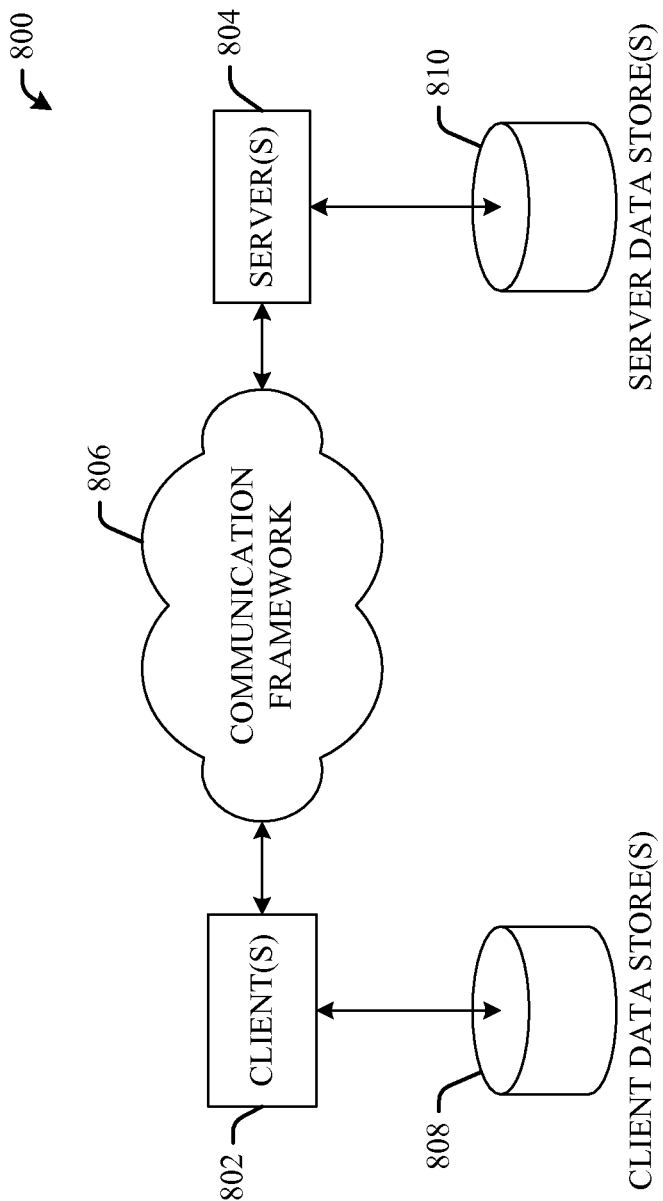
FIG. 8 is a schematic block diagram illustrating a suitable operating environment.
Figure 9:
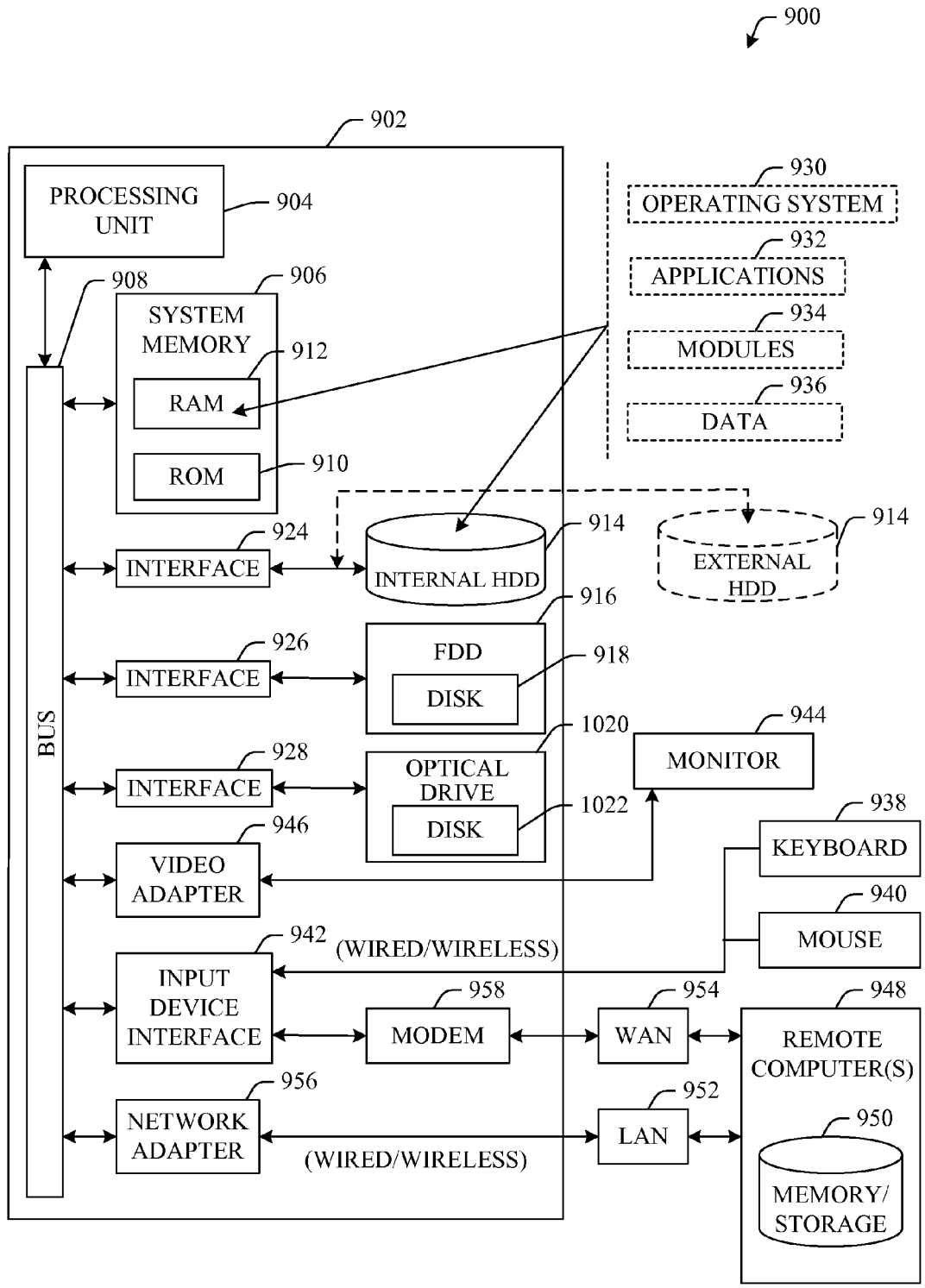
FIG. 9 is a schematic block diagram of a sample computing environment.

In order to provide a context for the various aspects of the disclosed subject matter, FIGS. 8 and 9 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 8, there is illustrated a schematic block diagram of a computing environment 800 in accordance with the subject specification. The system 800 includes one or more client(s) 802. The client(s) 802 can be hardware and/or software (e.g., threads, processes, computing devices). The client(s) 802 can house cookie(s) and/or associated contextual information by employing the specification, for example.

The system 800 also includes one or more server(s) 804. The server(s) 804 can also be hardware and/or software (e.g., threads, processes, computing devices). The servers 804 can house threads to perform transformations by employing the specification, for example. One possible communication between a client 802 and a server 804 can be in the form of a data packet adapted to be transmitted between two or more computer processes. The data packet can include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 904.

Referring now to FIG. 9, there is illustrated a block diagram of a computer operable to execute the disclosed architecture. In order to provide additional context for various aspects of the subject specification, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the example environment 900 for implementing various aspects of the specification includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A platform cryptographic key management system, comprising at least one processor coupled to at least one computer-readable storage medium storing instructions executable by the at least one processor to implement:
    a keyset management component configured to distribute at least one keyset to encrypt communications with a platform, in response to a request from at least one application component; and
    an auto-tuning component configured to scale a cloning of additional keysets from at least one existing keyset used in a first security application, the cloning scaled to meet a particular runtime demand associated with at least one additional security application different from the first security application.

2. The system of claim 1, wherein the keyset management component is configured to generate at least one new keyset.

3. The system of claim 1, wherein the keyset management component is configured to enforce keyset policy associated with generation and expiration of keysets.

4. The system of claim 1, wherein the first security application includes authentication, and the second security application includes at least one of encryption or decryption.

5. The system of claim 1, wherein the keyset management component is configured to refresh the at least one keyset distributed to the at least one application component after expiration of the at least one keyset, based at least upon keyset policy.

6. The system of claim 1, wherein the platform comprises one or more server components and the keyset management component is configured to dispense keysets to the one or more server components such that the one or more server components share keysets.

7. The system of claim 6, wherein the keyset management component is configured to push refreshed keysets to the one or more server components upon expiration of existing keysets.

8. The system of claim 6, wherein the at least one application component is configured to communicate with the one or more server components utilizing encryption based at least upon the keysets.

9. The system of claim 8, wherein the at least one application component is configured to perform authentication associated with a first server component, and to access data retained by the platform via a second server component.

10. The system of claim 1, wherein the at least one keyset comprises a public key and private key pair.

11. The system of claim 1, wherein the at least one keyset comprises a symmetric key.

12. The system of claim 1, wherein the at least one keyset includes at least one of an authentication session keyset or secure envelope keyset.

13. The system of claim 1, wherein the platform includes a health integration network, comprising a plurality of databases logically partitioned among physical data stores based on performance, and storing data including data that is self-describing by way of associated schemas, the plurality of databases including a record database configured to keep an audit trail of changes to records of the plurality of databases, and a directory database configured to store at least user account data.

14. A method, comprising:
    receiving a request for a keyset for authentication of a secure data communication;
    issuing, in response to the request, an issued keyset conforming to a keyset policy;
    and cloning a scaled amount of additional keysets from the issued keyset at runtime according to a runtime demand associated with the issued keyset, the additional keysets configured to facilitate at least one of encryption or decryption of another secure communication if the authentication is successful.

15. The method of claim 14, further comprising generating at least one new keyset.

16. The method of claim 14, further comprising performing the authentication via a first server component, and performing the at least one of the encryption or decryption via second server component different from the first server component.

17. The method of claim 14, further comprising refreshing at least one expired keyset with at least one new keyset.

18. The method of claim 14, further comprising including, in the keyset, at least one of an authentication session keyset or secure envelope keyset.

19. The method of claim 14, further comprising including, in the keyset, a symmetric key material.

20. A computer-readable storage memory storing instructions that if executed by a computing device cause the computing device to perform operations comprising:

distributing keysets among one or more server components;
refreshing distributed keysets with new keysets upon expiration of distributed keys;
and scaling a cloning of additional keysets from existing keysets to meet a runtime demand associated with a plurality of security applications.

* * * * *